United States Patent [19]

Wu

[11] 4,167,324

[45] Sep. 11, 1979

[54] APPARATUS FOR XEROGRAPHICALLY PRINTING A COMPOSITE RECORD BASED ON FIXED AND VARIABLE DATA

[75] Inventor: Alexander C. Wu, Plymouth, Mich.

[73] Assignee: Burroughs Corporation, Detroit, Mich.

[21] Appl. No.: 842,405

[22] Filed: Oct. 17, 1977

[51] Int. Cl.² ............... G03G 15/00; G03B 19/00
[52] U.S. Cl. ..................... 355/3 R; 354/3; 354/6; 355/7
[58] Field of Search ............ 355/3 R, 7, 14; 354/3, 354/5, 6

[56] References Cited

U.S. PATENT DOCUMENTS

| | | | |
|---|---|---|---|
| 3,045,587 | 7/1962 | Schwertz | 355/3 R X |
| 3,137,857 | 6/1964 | Kabell | 355/3 R X |
| 3,481,669 | 12/1969 | Roth et al. | 355/3 CH |
| 3,659,936 | 5/1972 | Klose et al. | 355/3 R |
| 3,673,596 | 6/1972 | McMahon et al. | 178/6.6 A X |
| 3,677,148 | 7/1972 | Chen | 355/3 R X |
| 3,698,006 | 10/1972 | Ovshinsky | 178/6.6 A X |
| 3,720,785 | 3/1973 | Van Auken | 178/6.6 A |
| 3,800,303 | 3/1974 | Picquendar et al. | 355/3 R X |
| 3,858,004 | 12/1974 | Mason et al. | 178/7.6 |
| 3,869,569 | 3/1975 | Mason et al. | 178/7.6 |
| 3,898,627 | 8/1975 | Hooker et al. | 340/172.5 |
| 3,947,190 | 3/1976 | Otubo et al. | 355/3 R |
| 4,014,605 | 3/1977 | Fletcher | 355/3 R |
| 4,046,471 | 9/1977 | Branham et al. | 355/3 R X |

Primary Examiner—Fred L. Braun
Attorney, Agent, or Firm—Carl Fissell, Jr.; Robert C. J. Tuttle; Kevin R. Peterson

[57] ABSTRACT

In an apparatus for xerographically printing a composite record based on first and second complementary sources of information. The first source of information is imaged onto a photoconductive drum to form a first electrostatic image thereof. The second source of information may be derived from a central processing unit in signal form. The signals received from the CPU are used to modulate the output beam of a scanning laser. The modulated laser output beam is directed to a stylus belt positioned in close surface proximity to the photoconductive drum bearing the first electrostatic image. The stylus belt includes an electrcially conductive layer and a photoconductive layer, and is responsive to the incident laser energy to translate it into a corresponding charge pattern. This charge pattern is overlaid on the first electrostatic image to form a composite electrostatic image. The composite image is then developed and transferred onto a record medium in a conventional manner.

14 Claims, 7 Drawing Figures

FIG. 5A.

Gotham City Bank
GOTHAM CITY, NY, 10001

Name
Address

Soc. Sec. No.
Acc't No.

Date  Deposit  Withdraw  Balance

Statement Date:

FIG. 5B.

JOHN R. DEPOSITER
32 TWAIN LANE
SMOKEY, PENNA, 51100
246-80-642
123456789

| | | |
|---|---|---|
| 8/24 100.00 | | 100.00 |
| 8/31 | 50.00 | 50.00 |
| 9/19 300.00 | | 350.00 |
| 9/20 INT .25 | | 350.25 |

Gotham City Bank
GOTHAM CITY, NY, 10001

Name JOHN R. DEPOSITER
Address 32 TWAIN LANE
SMOKEY, PENNA, 51100
Soc. Sec. No. 246-80-642
Acc't No. 123456789

| Date | Deposit | Withdraw | Balance |
|---|---|---|---|
| 8/24 | 100.00 | | 100.00 |
| 8/31 | | 50.00 | 50.00 |
| 9/19 | 300.00 | | 350.00 |
| 9/20 | INT .25 | | 350.25 |

Statement Date: 9/27/77

APPARATUS FOR XEROGRAPHICALLY PRINTING A COMPOSITE RECORD BASED ON FIXED AND VARIABLE DATA

BACKGROUND OF THE INVENTION

1. Field of the Invention

The present invention relates to the xerographic printing of information, and more particularly to a method and apparatus for xerographically printing a composite record based on first and second complementary sources of information.

2. Description of the Prior Art

In the most common form of xerographic printing process, a document or record is imaged onto a photoconductor to which has been applied a uniform electrostatic charge. The incidence of the light pattern on the photoconductor causes those areas subjected to light energy to become electrically conductive and allow for the passage of charge to ground; those areas of the photoconductor not exposed to light energy remain electrically insulative and retain an electrostatic charge distribution. The net effect of the imaging process is to create a latent electrostatic image of the document or record. This electrostatic image may then be developed by the application of toner material. The developed image can then be transferred from the photoconducted surface onto a record media.

The xerographic printing process just described is regarded as direct copy, i.e. a positive-to-positive transfer of an original document. More specifically, black areas on the original document will be represented by an electrostatic charge pattern, and white areas will be represented by the absence of electrostatic charge. Stated otherwise, the absence of light in an image pattern represents information, and the presence of light represents non-information or is without informational significance. This relationship is well suited to a xerographic reproduction process for the copying of an original document.

Moreover, the information to be xerographically printed may take an alternative embodiment other than an original document. For example, the information may be imaged by means of a scanning laser whose output is modulated in accordance with the flow of information. This particular embodiment is well adapted to the interfacing of a digital computer, magnetic card or tape, or facsimile transceiver with a xerographic printer. In these instances, a latent electrostatic image may be formed through an indirect process to accommodate the laser, i.e. the presence of light will now signify information, and the absence of light will signify the absence of information. The formation and processing of indirect or negative latent electrostatic images is known in the art and is not novel in itself.

However, one can envision a system where it is advantageous to have the capability to xerographically print, both individually or jointly, information derived from an original positive document and information derived from a second source, such as a central processing unit interfacing to the xerographic printer through a negative mode laser. A printer system incorporating both of these features must make accommodation for the inherently conflicting characteristics of printing from an original positive document combined with printing from a negative mode laser output. Put more specifically, printing from an original positive document connotes a direct or positive mode electrostatic image; and printing from a scanning light source such as a laser connotes an indirect or negative mode electrostatic image.

A good example of where one may want to combine the xerographic reproduction of an original document with the xerographic printing of computer generated data is in an accounting environment where periodic reports of several various accounts must be generated. Each account report may contain recurring information that may be regarded as fixed data, together with specific non-recurring information peculiar to that individual account that may be regarded as variable data. A practical example would be a monthly statement prepared by a bank and sent out to its savings account customers. The heading and format information would represent the fixed data, and the account information containing the depositor's name, account number, dates and amounts of transactions, etc. would represent the variable data. A xerographic printing system containing the capability to print a composite record containing both the fixed and variable data would be very advantageous in this environment.

It is a principal objective of the present invention to provide a xerographic copying system that incorporates the capability of printing both fixed positive image data along with variable data onto a single composite record.

SUMMARY OF THE INVENTION

The present invention is a xerographic copier and associated method that provides the capability of printing a record or copy based on or derived from first and second complementary sources of information.

Broadly, the printer comprises a photoreceptive medium, formed of an electrically conductive base layer and a photoconductive surface layer. The xerographic printing process begins by the application of a uniform electrostatic charge to the photoconductive surface layer. The photoreceptive medium is then exposed to an incident light pattern representative of information from the first source. The incidence of the light pattern onto the photoconductive surface results in an electrostatic representation or image of the information from the first source. The electrostatic image is then modified by a second imaging station coupled to the second informational source to form a composite latent electrostatic image embodying information from both the first and second sources.

The composite image is then developed by a developing station through the application of toner material or similar such method. The developed image is then transferred from the photoreceptive medium onto a record medium. The printing cycle then closes by the cleaning of the photoreceptive medium preparatory to re-entering the cycle.

In a practical application of the invention, the information from the first source may be fixed in nature, e.g. an original document. The information from the second source may be variable in nature, such as the signal output from the central processing unit of a computer or the input signal to a facsimile transceiver, or the playback signal from a magnetic tape or card. The advantage of the present invention is that information from both the first and second sources can be combined to form a composite record, or, alternatively, may be printed individually.

In the embodiment to be hereinafter disclosed, the second imaging means is generally broken down into two stages: a laser imaging stage that transforms incoming informational signals into a corresponding light pattern, and a stylus stage that receives the light pattern output of the laser stage and translates it into a corresponding electrostatic pattern on the photoreceptive medium.

More specifically, the laser stage includes a control unit for buffering and decoding incoming informational signals. The decoded signals are received by a modulator which modulates the output of a laser in accordance therewith. The laser output is received by the stylus, which broadly takes the form of a stratified belt. The inner stratum of the belt is an electrically insulative, optically translucent layer, the intermediate stratum of the belt is an electrically conductive, optically translucent layer, and the outer stratum of the belt is a photoconductive layer. The belt is positioned in close surface proximity to the photoreceptive medium, and the electrically conductive intermediate layer of the belt is held at an electrical potential of sufficient magnitude to cause breakdown in the air gap between the belt and the photoreceptive medium. Light energy from the laser impinging upon the belt passes through the translucent inner and intermediate strata to the outer, photoconductive stratum. The incidence of light energy on the outer stratum causes it to become momentarily electrically conductive and allow for the passage of discharge current from the intermediate stratum to the photoreceptive medium. In this manner, the electrostatic image representing the first source is modified to include the information from the second source to form a composite image. The composite image may thereafter be developed and transferred onto a record medium.

Other advantages of the present invention will be readily appreciated as the same becomes better understood by reference to the following detailed description when considered in connection with the accompanying drawings.

BRIEF DESCRIPTION OF THE DRAWING

FIG. 5A, B and C illustrate, respectively, fixed data, variable data, and a composite representation of the fixed and variable data in a bank statement that is exemplary of the kind of record that may be printed by the xerographic printer of the present invention.

DETAILED DESCRIPTION OF A SPECIFIC EMBODIMENT

Figure 1:
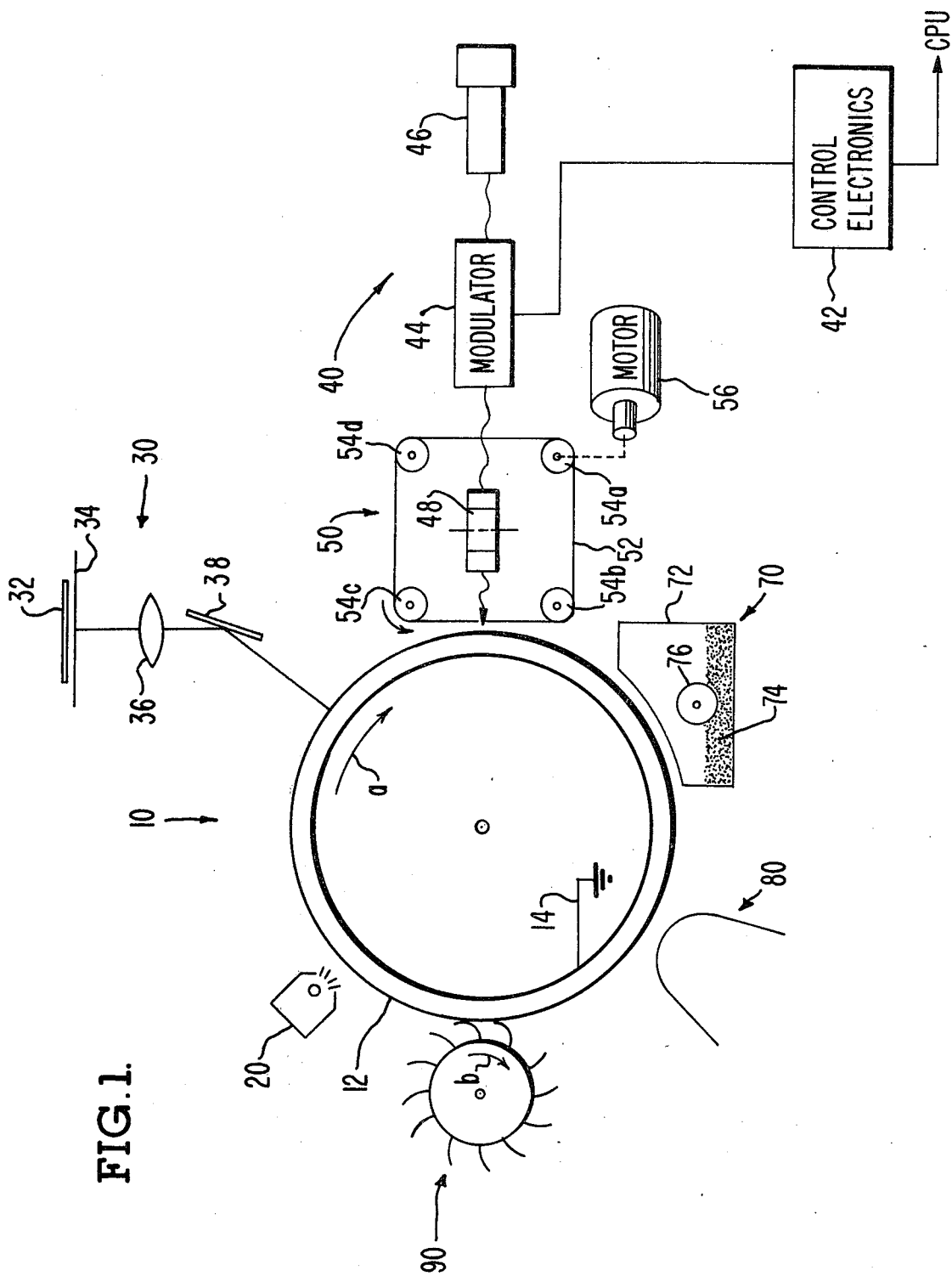
FIG. 1 is an overall, schematic representation of a xerographic printer incorporating the present invention.

FIG. 1 is a schematic illustration of a xerographic printer 10 incorporating the present invention. The printer 10 is logically broken down into a plurality of sub-systems, each of which performs a specified step in the overall printing process. The discussion will proceed with a broad description of each of the plurality of sub-systems, and then advance to a specific description of the inventive sub-system.

A central component of the system 10, with which all of the various sub-systems cooperate, is a photoconductive drum 12. The drum 12 is similar to the drums used in commercial xerographic printers. More specifically, it comprises an annular, aluminum rim with a coating of photoconductive material on its circumferential surface. The drum rotates by drive means (not shown) in the direction of arrow a. The rim is grounded by a ground connection 14. The structure of the drum 12 will hereinafter be described in greater detail as it becomes pertinent to an understanding of the present invention.

The first sub-system is a corona discharge unit 20. The function of the corona discharge unit is to apply a uniform electrostatic charge to the circumferential surface of the drum 12. The discharge unit 20 may be of the conventional design used in commercial photocopying equipment. The selection of a specific corona discharge unit design is not essential to the operation of the present invention.

The next sub-system to be discussed is hereinafter characterized as a fixed data imaging station 30. The function of the fixed data imaging station 30 is to image a light pattern representative of information contained on an original document onto the drum 12 to form an electrostatic image thereof. More specifically, an original document 32 is laid face down on a glass platen 34 and imaged through a lens system, schematically indicated by lens symbol 36, in conjunction with a mirror array, schematically indicated at 38, onto the drum 12. As is well known in the art, the incidence of light energy onto a photoconductor causes those areas exposed to the energy to become electrically conductive. Any electrostatic charge previously residing on the exposed portion of the semiconductor is conducted to ground. This phenomenon effectively creates an electrostatic representation or image of the document 32 on the drum 12.

The next sub-system to describe is hereinafter characterized as a variable data imaging station 40. The broad function of the variable data imaging station is to modify the electrostatic representation of the data from the fixed data imaging station 30 into a composite electrostatic image combining information from a second, complementary source. The specific structure and operation of the variable data imaging station 40 will hereinafter be described in greater detail.

The next sub-system is a developing station 70. The function of the developing station 70 is to develop the composite electrostatic image on the drum 12 by the application of toner material. The developing station includes a reservoir 72 containing a supply of dry particle toner material. The toner material is applied by a magnetic brush, symbolically indicated by 76. The developing station 70 may be of any conventional sort presently known in the art. The selection of a specific design is not essential to the practice of the present invention.

The next sub-system is a transfer station, schematically indicated at 80. The function of the transfer station is to transfer the developed composite image on the drum onto a record medium. The transfer station apparatus may be of any type known in the art, and the selection of a specific design is not essential to the practice of the present invention.

The next sub-system to be described is a drum cleaning station 90. The function of the cleaning station 90 is to clean the drum 12 of residual toner particles remaining on the drum after the completion of the printing cycle. The general design of the cleaning station 90 includes a bristled brush rotating in the same direction of the drum 12. The selection of a specific cleaning station design is not essential to the practice of the present invention.

Attention is now directed to the variable data imaging station 40 which will presently be described in detail.

In the disclosed embodiment, the variable data takes the form of signal output from a central processing unit (CPU). The function of the variable data imaging station 40 is to translate the signal information from the CPU into a corresponding electrostatic charge pattern on the drum 12. In oveview, the translation of the signal information into a charge pattern involves two basic steps. First, the signal information is translated into a corresponding light pattern by the modulation of a laser. Secondly, the modulated laser signal is received by a stylus belt that discharges current onto the drum in the areas where it is exposed to incident light energy.

More specifically, the first step is carried out by the cooperation of a laser 46, an associated laser modulator unit 44, and a control electronics unit 42 that decodes and drives the modulator 44. The signal information from the central processng unit is received as input by the control electronics unit 42, where it is buffered and decoded. The decoded signals from the control electronics unit 42 are received as input by the modulator unit 44. The function of the modulator unit is to modulate the output of the laser 46 in accordance with the decoded signal input. The output beam of the laser is then caused to scan across the lateral dimension of the drum 12 by a polygonal scanner 48. Each of the previously described components is commercially available as follows: the laser 46 is preferably a low-power, Helium-Neon laser and is obtainable from Spectra-Physics, 1250 West Middlefield Rd., Mountain View, Calif. 94040, Model 125; the modulator 44 and control electronics unit 42 are obtainable from Isomet, 5414 Port Royal Rd., Springfield, Va. 22151; Model Nos. 1205 and 222-1 respectively; and the polygonal scanner 48 is obtainable from Scanco Inc., 145 Water Street, South Norwalk, Conn. 06854.

The second step of the variable data imaging process involves the translation of the modulated laser beam into a corresponding electrostatic charge pattern. For this purpose, the sub-system includes a novel stylus, generally indicated at 50. The stylus is formed as a stratified belt 52 mounted in conveyor-like fashion on a plurality of rollers 54a, b, c and d. Roller 54a is driven by a motor 56 to transport the belt in the direction indicated by the arrow.

Figure 3:
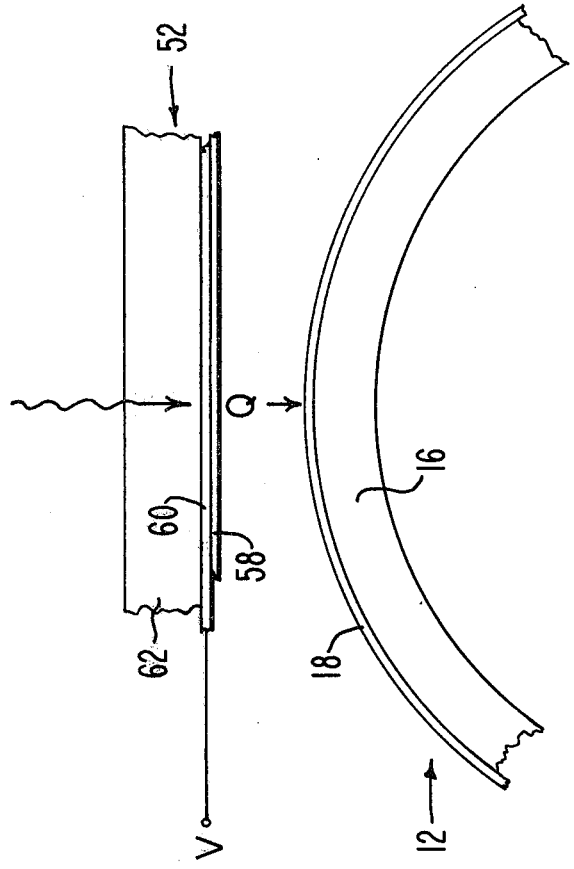
FIG. 3 is an enlarged representation of a portion of the novel variable data imaging station of the present invention.

Please make reference now to FIG. 3 for an explanation of the specific structure of the stylus 50 and its cooperation with the drum 12.

The stylus belt 52 comprises three strata. An inner stratum 62 is defined by an optically translucent, electrically insulative layer of base material. In the preferred form, the base material is Mylar having a thickness of 5 mils. An intermediate or central stratum 60 is defined by a layer of optically translucent, electrically conductive material. In the preferred form the intermediate stratum 60 is formed of aluminum, having a thickness of only a few Angstroms. The intermediate stratum 60 is energized at an electrical potential V of sufficient magnitude to cause breakdown across the air gap between the drum 12 and belt 52, for reasons that will hereinafter become apparent. The air gap has a range of between 8 to 203 microns with a corresponding range of voltage of between 600 to 1500 volts, respectively. The smallest gap of 8 microns is a virtual contact relationship that represents the lower limit due to surface roughness. The inner and central strata may be purchased as a commercial unit from Coating Products, Inc., Englewood Cliffs, N.J. An outer stratum 58 is defined by a thin layer of photoconductive material. In the preferred form the outer stratum 58 is formed of cadmium sulfide and has a thickness of approximately 75 microns. The photoconductive surface 58 may be sprayed on by conventional coating techniques known in the art.

As was hereinbefore broadly indicated, the drum 12 comprises a hollow cylindrical rim 16 formed of aluminum or similar type electrically conductive material, and an outer surface coating of photoconductive material 18. It is important for reasons that will hereinafter be made apparent that the photoconductive layer 18 be responsive to light energy of different wavelength than photoconductive layer 58. In the preferred form of the invention, photoconductive layer 18 is formed of selenium and has a thickness of approximately 50 microns.

The stylus belt 52 functions to translate the incident laser beam energy into a corresponding electrostatic charge pattern on the photoconductive surface 18. The manner in which this process occurs will next be discussed.

Light energy from the laser 46 impinging upon the stylus belt 52 passes through the translucent inner and central strata 62 and 60 to the outer, photoconductive stratum 58. The exposure of light energy onto any point of the photoconductive stratum 58 will cause that point to become electrically conductive. The exposed area then becomes electrically communicative with the central stratum 60, which is energized at the electrical potential V, which is of sufficient magnitude to cause breakdown in the air gap between the stylus belt 52 and the photoconductive drum 12. This relationship between the outer stratum 58 and central stratum 60 now allows discharge current to flow between the conductive areas on outer stratum 50 and photoconductive layer 18, as indicated by Q in the arrow indicating the direction of charge travel. In effect, the outer, photoconductive stratum 58 normally acts as an insulative layer between the photoconductive surface 18 and intermediate stratum 60. However, when the outer stratum 58 is exposed to light energy, it becomes electrically communicative and allows the passage of discharge current. The dissimilarity in spectral sensitivity of photoconductive surfaces 18 and 58 is provided to allow the photoconductive surface 18 to remain electrically insulative when exposed to the laser light energy.

The flow of discharge current Q modifies the first electrostatic image to form a composite electrostatic image that includes the information from the second source. One may functionally regard the belt 52 as an instantaneous stylus that becomes enabled when energized by a laser output.

Figure 2:
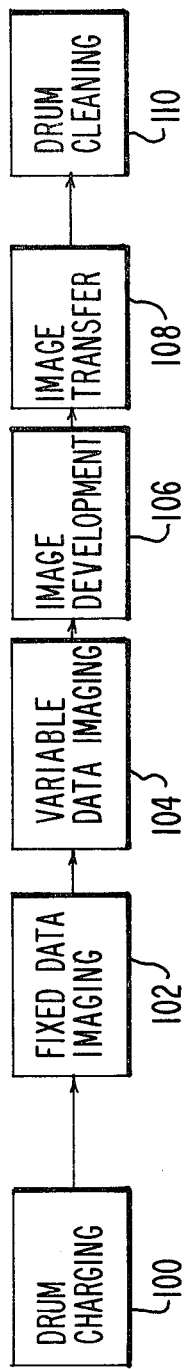
FIG. 2 is a flow chart illustrating the various steps involved in the xerographic printing process of the present invention.

Referring now to FIG. 2, the steps in the overall xerographic printing process are presented in flow chart form.

In step 100 the photoconductive drum 12 is charged by the application of a uniform layer of conductive charge by the corona discharge means 20.

In step 102 fixed data is imaged onto the photoconductive drum 12 by the fixed data imaging station 30. In this step a first electrostatic image representing the fixed data is formed on the drum.

Figure 4:
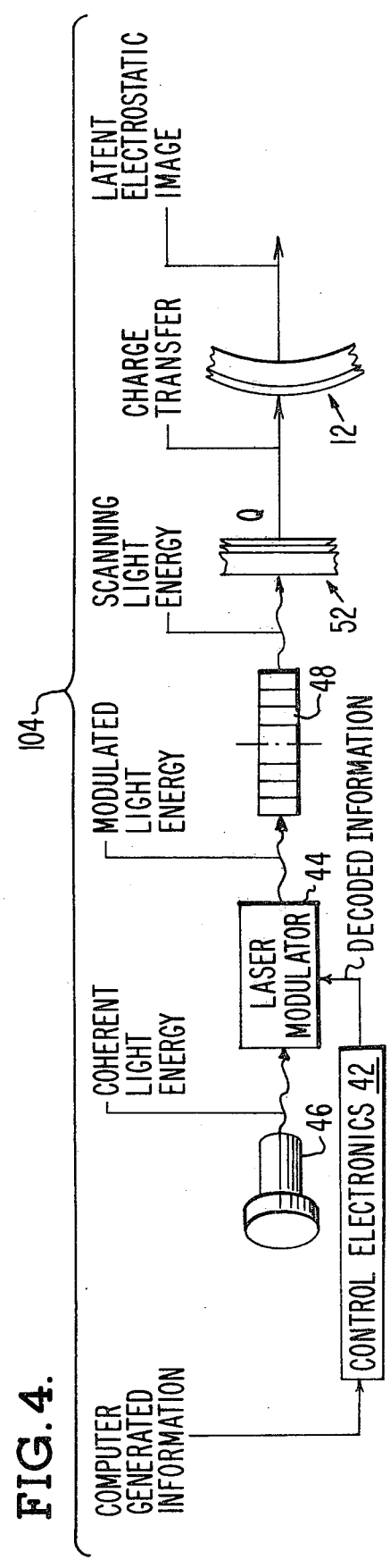
FIG. 4 is a block diagram representation of the steps in the variable data imaging process of the present invention.

In step 104 the variable data is imaged onto the drum by the variable data imaging station 40. The specific sub-steps of step 104 are identified in greater detail in FIG. 4, to which reference is now made.

First, information derived from a central processing unit or other source is input to the control electronics unit 42 for decoding. The decoded information drives the laser modulator unit 44, which is coupled to the output of the laser 46. The modulated output of the laser is scanned across the lateral dimension of the photoconductive belt by a rotating polygonal scanner 48. The scanning light energy is then exposed onto the stylus belt 52. The stylus belt translates the scanning light energy into a corresponding charge pattern that is transferred onto the photoconductive drum 12. The result is a composite, latent, electrostatic image that represents information from the second source overlaid with the electrostatic image representing the first source.

Continuing again with FIG. 2, the composite electrostatic image is developed in step 106 by the application of toner material at developing station 70.

In step 108, the developed image is transferred by transfer station 80 onto a record medium, such as plain paper, to complete the printing process.

In step 110, the printing cycle comes to a close by the cleaning of residual toner materials from the drum 12 by the cleaning station 90.

FIGS. 5A, B and C represent, respectively, fixed information from a first source, variable information from a second source, and a composite representation of information from both the first and second sources.

More specifically, FIG. 5A represents the heading and format information that would be associated with a bank statement. The printing of a bank statement is exemplary of the type of application for which the present invention is well suited. FIG. 5B illustrates the variable information of the bank statement including such items as the name and address of the depositor, account number, and dates and amounts of transactions. FIG. 5C incorporates the text of both FIGS. 5A and 5B in a composite r presentation.

There is no requirement that the variable data imaging station of the present invention must function in combination with the fixed data imaging station. An alternative embodiment to the present invention could have the variable data imaging station functioning alone without the fixed data imaging station and vice versa. There is no limitation on the invention in this regard.

The invention has been described in an illustrative manner, and it is to be understood that the terminology which has been used is intended to be in the nature of words of description rather than of limitation.

As hereinbefore indicated, many modifications and variations in the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. Apparatus for xerographically printing information from first and second complementary informational sources onto a record medium comprising:

a photoreceptive medium comprising an electrically conductive base layer and a photoconductive surface layer;

charge deposit means for applying a uniform deposition of charge onto the photoreceptive medium;

first imaging means for imaging a light pattern representative of information from the first source onto the charge deposition on the photoreceptive medium to form a first electrostatic image embodying the information from the first source;

said information from said second source being derived from a central processing unit;

second imaging means for applying an electrostatic charge pattern representative of information from the second complementary source onto the photoreceptive medium over the first electrostatic image to form a composite electrostatic image embodying the information from both the first and second sources;

said second imaging means including laser means responsive to informational signals from said central processing unit for providing a pattern of light energy representative thereof and stylus means, responsive to said pattern of light energy provided by said laser means, for translating said pattern of light energy into a corresponding electrostatic charge pattern and transferring the charge pattern onto said photoreceptive medium;

developing means for developing the composite electrostatic image on the photoreceptive medium; and image transfer means for transferring a developed composite image from the photoreceptive medium onto the record medium.

2. The invention as defined in claim 1 wherein the laser means is further defined to include:

a laser;

decoder means, responsive to informational signals from the central processing unit, for decoding the signals, modulator means, responsive to the decoded signals from the decoder means, for modulating the output light energy of the laser in accordance therewith; and scanner means, responsive to the light energy output of the laser, for scanning the light energy over the lateral dimension of the photoreceptive medium.

3. The invention as defined in claim 2 wherein the scanner means is further defined to include a rotating polygonal scanner.

4. The invention as defined in claim 2 wherein the laser is a Helium-Neon (HeNe) laser.

5. In a xerographic printer of the class wherein information from a first informational source is printed through the process of applying a uniform electrostatic charge to a photoreceptive medium and imaging a light pattern representative of the information from said first source to form a first electrostatic image thereof, an improvement comprising means for printing information from a second complementary informational source in composite form with the information from the first source, the improvement characterized by:

second imaging means for applying an electrostatic charge pattern representative of information from the second complementary source onto the photoreceptive medium over the first electrostatic image to form a composite electrostatic image embodying the information from both the first and second sources;

said information from said second source being derived from a central processing unit;

said second imaging means further including laser means responsive to informational signals from said central processing unit for providing a pattern of light energy representative thereof; and stylus means, responsive to said pattern of light energy provided by said laser means, for translating said pattern of light energy into a corresponding electrostatic charge pattern and transferring the charge pattern onto said photoreceptive medium.

6. The invention as defined in claim 5 wherein the laser means is further defined to include:
a laser;
decoder means, responsive to informational signals from the central processing unit, for decoding the signals;
modulator means, responsive to the decoded signals from the decoder means, for modulating the output light energy of the laser in accordance therewith; and
scanner means, responsive to the light energy output of the laser, for scanning the light energy over the lateral dimension of the photoreceptive medium.

7. The invention as defined in claim 6 wherein the scanner means is further defined to include a rotating polygonal scanner.

8. The invention as defined in claim 8 wherein the laser is a Helium-Neon (HeNe) laser.

9. Apparatus for xerographically printing information from first and second complementary informational sources onto a record medium comprising:
a photoreceptive medium comprising an electrically conductive base layer and a photoconductive surface layer;
charge deposit means for applying a uniform deposition of charge onto the photorespective medium;
first imaging means for imaging a light pattern representative of information from the first source onto the charge deposition on the photoreceptive medium to form a first electrostatic image embodying the information from the first source;
said information from said second source being derived from a central processing unit;
second imaging means for applying an electrostatic charge pattern representative of information from the second complementary source onto the photoreceptive medium over the first electrostatic image to form a composite electrostatic image embodying the information from both the first and second sources;
said second imaging means including laser means responsive to informational signals from said central processing unit for providing a pattern of light energy representative thereof, and stylus means, responsive to said pattern of light energy provided by said laser means, for translating said pattern of light energy into a corresponding electrostatic charge pattern and transferring the charge pattern onto said photoreceptive medium;
said stylus means including a stratified belt mounted in close surface proximity to said photoreceptive medium;
said stratified belt including:
an optically translucent base stratum;
an optically translucent, electrically conductive intermediate stratum energized at an electrical potential; and
a photoconductive outer stratum formed of material optically dissimilar to said photoconductive surface layer of said photoreceptive medium;
developing means for developing the composite electrostatic image on the photoreceptive medium; and
image transfer means for transferring a developed composite image from the photoreceptive medium onto the record medium.

10. The invention as defined in claim 9 wherein the photoreceptive medium is embodied in a rotating member, and the stratified belt is mounted on conveyor means for transporting the belt past the photoreceptive medium in close tangential proximity thereto.

11. The invention as defined in claim 9 wherein:
the base stratum is formed of Mylar;
the intermediate stratum is formed of aluminum;
the outer stratum is formed of cadmium sulfide; and
the photoconductive surface layer of the photoreceptive medium is formed of selenium.

12. In a xerographic printer of the class wherein information from a first informational source is printed through the process of applying a uniform electrostatic charge to a photoreceptive medium and imaging a light pattern representative to the information from said first source to form a first electrostatic image thereof, an improvement comprising means for printing information from a second complementary informational source in composite form with the information from the first source, the improvement characterized by:
second imaging means for applying an electrostatic charge pattern representative of information from the second complementary source onto the photoreceptive medium over the first electrostatic image to form a composite electrostatic image embodying the information from both the first and second sources;
said information from said second source being derived from a central processing unit;
said second imaging means further including laser means responsive to informational signals from said central processing unit for providing a pattern of light energy representative thereof and stylus means, responsive to said pattern of light energy provided by said laser means, for translating said pattern of light energy into a corresponding electrostatic charge pattern and transferring the charge pattern onto said photoreceptive medium;
said stylus means including a stratified belt mounted in close surface proximity to said photoreceptive medium;
said stratified belt including:
an optically translucent base stratum;
an optically translucent, electrically conductive intermediate stratum energized at an electrical potential; and
a photoconductive outer stratum formed of material optically dissimilar to the photoconductive surface layer of said photoreceptive medium.

13. The invention as defined in claim 12 wherein the photoreceptive medium is embodied in a rotating member, and the stratified belt in mounted on conveyor means for transporting the belt past the photoreceptive medium in close tangential proximity thereto.

14. The invention as defined in claim 12 wherein the base stratum is formed of Mylar;
the intermediate stratum is formed of aluminum;
the outer stratum is formed of cadmium sulfide; and
the photoconductive surface layer of the photoreceptive medium is formed of selenium.

* * * * *